Feb. 6, 1951            H. BEUKELMAN            2,540,707
FLORIST'S PACK AND JACKET FOR THE SAME
Filed Oct. 30, 1945            2 Sheets-Sheet 1
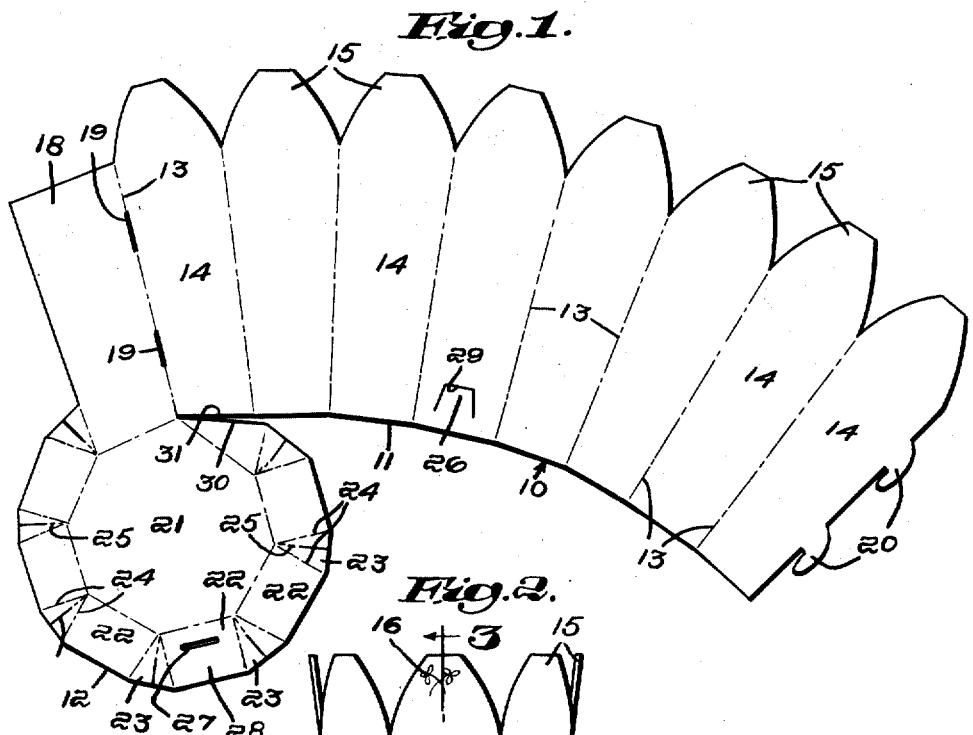
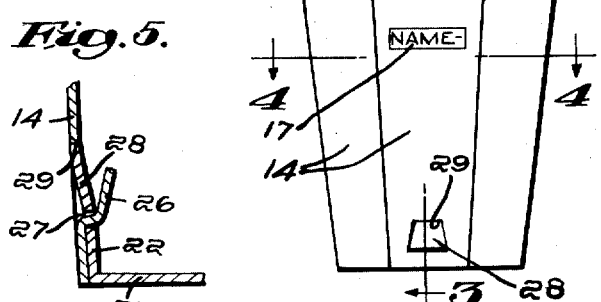
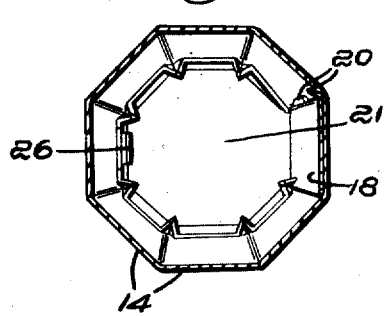
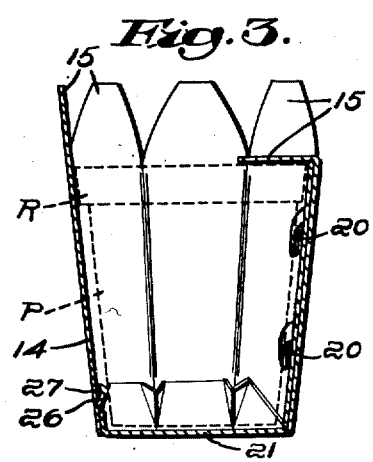
Inventor:
Henry Beukelman
by Spear & Spear
Attorneys Feb. 6, 1951 H. BEUKELMAN 2,540,707
FLORIST'S PACK AND JACKET FOR THE SAME
Filed Oct. 30, 1945 2 Sheets-Sheet 2
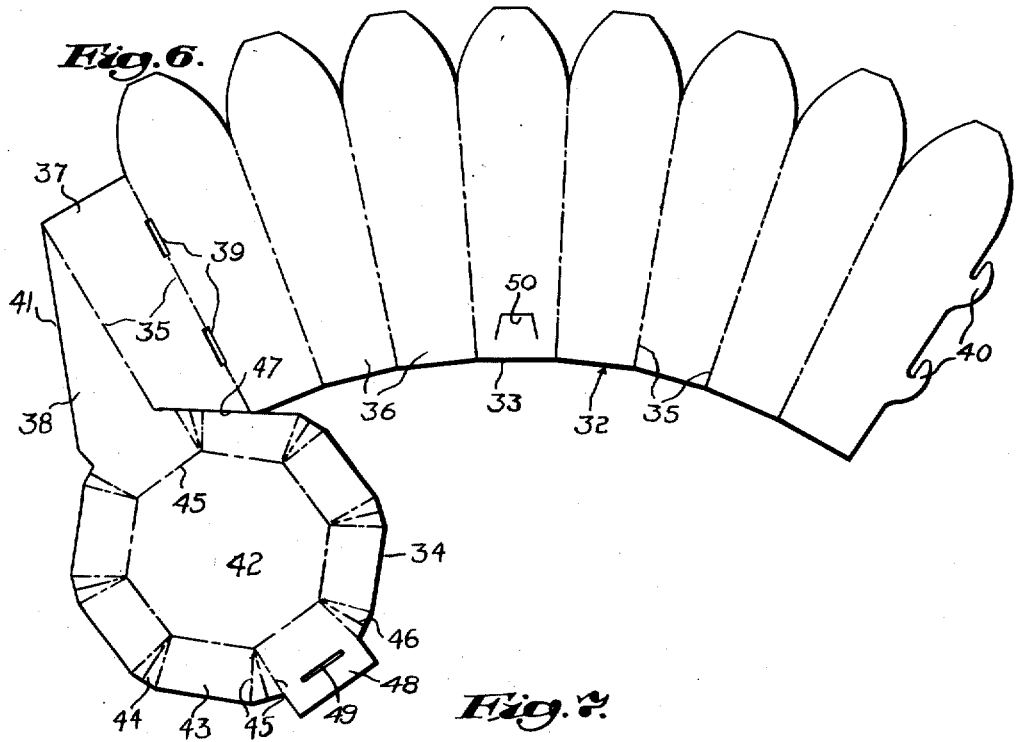
Inventor:
Henry Beukelman,
by Spear+Spear
Attorneys Patented Feb. 6, 1951

2,540,707

UNITED STATES PATENT OFFICE 2,540,707

FLORIST'S PACK AND JACKET FOR THE SAME

Henry Beukelman, Camden, Maine

Application October 30, 1945, Serial No. 625,565

6 Claims. (Cl. 229—21)

My present invention relates to jackets for flower pots and particularly to a jacket that may be quickly and easily formed from a flat blank.

The usual potted plant has been inadequate as to appearance, especially when sent as a gift, on account of the clay or like pot. Heretofore, it has been the practice to cover the clay pot with a ruffling of crepe or like paper. While such a cover, when new, makes a potted plant more attractive, it is unsatisfactory due to the fact that it is easily torn and also because it becomes spotted by the absorption of moisture when the plant is watered with the result that it soon disintegrates and falls away from the clay pot.

In accordance with my invention, I provide a flower pot jacket of bendable and preferably moisture resistant stock and comprising a side wall member, the ends of which are interlocked, and a bottom member having marginal portions upwardly bent and attached to the lower part of the side wall member.

Such a jacket may be most conveniently established from a flat blank that may be cut by a die from suitable stock such as cardboard coated to render it water-resistant. My blank has preferably first and second integral members. The first member is adapted to be shaped to provide a pot enclosing side wall when its ends are interlocked and the second member is foldable with reference to the first member to provide a jacket bottom. Preferably, the marginal portions of the second member are foldable upwardly to form a rim in which certain of the portions engage the lower part of the wall and certain of the portions from pleats. At least one of the marginal portions is attached to the lower part of the first member to complete the jacket and preferably the pleats are inwardly disposed to engage with and center the lower part of the pot.

The blanks may be formed to establish jackets of various shapes. Because the blanks are flat, they may be easily printed with decorative designs to increase the attractiveness of the appearance of the jackets. As the blanks are preferably moisture resistant, they are well adapted for long use and afford protection between the plants and the supports on which they are placed. In addition, the flat blanks may be conveniently packaged and shipped.

In the accompanying drawings, I have shown embodiments of my invention from which these and other of its novel features and advantages will be readily apparent.

In the drawings:

Fig. 1 is a plan view of a blank in accordance with my invention.

Fig. 2 shows a flower pot jacket erected from the blank of Fig. 1.

Fig. 3 is a section along the lines 3—3, of Fig. 2 and a flower pot suggested in dotted lines.

Fig. 4 is a section along the lines 4—4, of Fig. 2.

Fig. 5 is an enlarged fragmentary section through the interlock between the side and bottom walls of the jacket.

Fig. 6 is a view similar to Fig. 1 showing a modification of my invention, and

Fig. 7 is a section through a holder formed from the blank of Fig. 6.

In the embodiment of my invention shown in the drawings, the flower pot jacket is formed from a flat blank, generally indicated at 10, in Fig. 1. The blank 10 may be of any easily bendable water resistant stock such as cardboard coated to render it water-resistant.

The blank 10 has, as indicated in Fig. 1, an arcuate portion 11 and a bottom establishing portion 12. The arcuate portion 11 is adapted to be shaped to form the side wall of a downwardly and inwardly tapering jacket to enclose a typical flower pot indicated at P in dotted lines in Fig. 3. Preferably the side wall of the jacket engages the rim R of such a pot and is spaced from its sides below the rim.

The side wall establishing portion 11 may be shaped to form a jacket of any desired contour. In the drawings, I have shown it as scored at 13 to establish fold lines to define a plurality of panels 14 which may terminate in tips 15 shaped to increase the attractiveness of the jacket. The blank 10 may also be printed with a decorative design such as is indicated at 16 and with such data as is suggested at 17 to indicate the donor, the donee, or the florist's name.

I have shown the blank 10 as having at one end an extension 18 which is adapted to extend in back of the panel 14 at the other end of the portion 11 when shaped to establish the jacket wall. While the ends of the portion 11 may be interlocked in any desired way, I have shown the score line 13 between the extension 18 and the adjacent panel 14 as having slots 19 spaced to receive locking tabs 20 with which the panel at the other end of the portion 11 is formed.

I form the bottom portion 12 with a center part 21 and marginal portions 22 separated from each other by the portions 23. Preferably, score lines 24 and 25 are made to facilitate the bending of the marginal portions 22 and 23 relative to the center part 21 to form a rim with the portions 22 disposed to engage with the lower part of the jacket side wall when the portion 12 is bent with reference to the portion 11 to establish the bottom of the jacket.

When the rim is thus formed, the marginal portions 23 constitute pleats projecting preferably inwardly to engage with and center the lower part of the flower pot P. The stock from which the blanks 10 are cut has, when bent to establish pleats, sufficient resilience to urge the marginal portions 22 against the jacket side wall. I have shown the outer ends of the score lines 25 as severed to facilitate the bending of the marginal portions into rim forming position.

In order that the bottom of the jacket may be firmly locked to the side wall, I cut one of the panels 14 to establish a tab 26 which may be inserted through a slot 27 cut in one of the marginal portions 22 of the portion 12. While the jacket bottom may be locked to the side wall by other means, the use of a tab and slot interlock is preferred for simplicity and convenience in assembling the jacket. As shown in Fig. 5, the stock 28 above the slot 27 constitutes, in the completed jacket, a projecting easily released lock engageable with the edge 29 established when the tab 26 was formed.

In order that the bottom edges of the jacket side wall may appear as a uniform bottom line of the jacket, the blank is cut, as shown in Fig. 1, so that the edge 30 of the marginal portion 22 adjacent the side wall 11 tapers downwardly towards the indicated fold line 31. By forming the edge 30 so that it does not meet the fold line 31, a continuous bottom wall may be established. Preferably, the tapering edge 30 nearly intersects the fold line 31 in order to preserve the symmetry of the side wall and to avoid the necessity of establishing a pleat between the edge 30 and the side wall extension 18.

When it is desired that the wall of the bottom of a holder in accordance with my invention be continuous and of more substantial height, the blank 32 of Fig. 6 may be used. The blank 32 is generally similar to the blank 10 of Fig. 1 and has portions 33 and 34 to establish the sides and bottom, respectively, of the flower pot jacket.

The side wall establishing portion 33 is arcuate and is scored as at 35 to establish fold lines defining panels 36 the upper ends of which may be shaped as desired. At one end, the portion 33 has panels 37 and 38. Between the panels 37 and the next adjacent panel 36 are slits 39 to receive upwardly disposed locking tabs 40 with which the panel 36 at the other end of the portion 33 is formed. Preferably the upper slit 39 is slightly wider than the lower slit 39 to facilitate assembly of the jacket. The panel 38 may have a diagonal edge 41, if desired.

The bottom establishing portion 34 of the blank 32 is connected to the panel 38 and consists of a center part 42 and marginal portions 43 separated from each other by portions 44. Score or fold lines 45 and 46 facilitate the bending of the marginal portions 43 and 44 relative to the center part 42 to form a rim with the portions 43 engaging the lower part of the side wall of the jacket and with the portions 44 establishing pleats engageable with the lower part of the flower pot.

It will be noted that the line of fold 45 between the panel 38 and the bottom establishing portion 34 establishes a continuation of the bottom line of the jacket side walls defined by the bottom edges of the panels 36. The bottom edge 47 of the panel 37, however, extends diagonally upwardly towards the panel 38 to permit the marginal portions 43 and 44 of the bottom to establish a bottom wall of uniform height. In the assembled jacket, the bottom edge 47 is concealed as the panel 37 is covered by the panel 36 having the locking tabs 40.

While the bottom of the jacket may be locked to its side wall in the same manner as I have disclosed and described in connection with the embodiment of my invention shown in Figs. 1–5, I have shown one of the marginal portions 43 as having a extension 48 having a slot 49 adapted to receive the tab 50 formed in one of the panels 36.

In accordance with my invention, efficient, attractive, and economical flower pot jackets may be easily established from blanks that may be shipped flat to the florist or other user. When the panels have tips, such tips may, if desired, be bent inwardly, as suggested in Fig. 3, to cover the dirt to increase the insulation against moisture evaporation, or they may be bent downwardly to resiliently engage the rim R of the pot P. As the stock from which my jackets are formed is moisture resistant, the jackets are well adapted not only for long service, but also to afford protection between the flower pots and the supports on which they are placed, against moisture and the soil which is usually found when a potted plant is moved.

It will be understood that, while I have shown the side wall as having a plurality of panels, I may form the blanks to establish other designs. It will also be understood that various other modifications in the structure and design of my jacket may be resorted to without departing from the spirit of my invention if within the limits of the appended claims.

What I therefore claim and desire to secure by Letters Patent is:

1. A jacket establishing blank for flower pots or the like, said blank comprising a member to be shaped to provide a pot enclosing wall and having first, second and third integral sections, said member having at one end locking tabs and between said second and third sections having slits to receive said locking tabs, a bottom establishing member connected to said third section and foldable along a line located with reference to the bottom edge of said first section to define the bottom edge of said jacket, the bottom edge of said second section tapering upwardly towards the third section, said bottom establishing member having a center part and marginal portions foldable to provide upstanding wall sections of substantially uniform size and shape, and a plurality of inwardly disposed pleats of substantially uniform size and shape interconnecting said wall sections to each other and to said third section, and means to lock one of said wall sections to said first section of said first member.

2. The jacket of claim 1, in which the end of the third section tapers upwardly towards the second section.

3. The jacket of claim 1 in which one of the marginal portions has an extension and has a slot substantially in alinement with the upper edges of the other marginal portions and the first section of the wall forming member has a tab disposed to enter the slot when the jacket is assembled.

4. A jacket establishing blank for flower pots or the like, said blank comprising first, second and third integral portions, the first of which is to be shaped to provide a pot enclosing wall, the second of which includes a center part and a marginal part foldable to provide upstanding wall sections and a plurality of inwardly disposed pleats interconnecting said wall sections, one of said wall sections constituting a part of said third portion and said third portion constituting a web interconnecting said first and second portions, means to interconnect the ends of said first portion in overlapping relation to said third portion and the wall sections of said second portion, and means interconnecting one of said wall sections to said first portion in a zone substantially opposite the junction between it and said third portion.

5. A jacket establishing blank for flower pots or the like, said blank comprising first and second portions, the first of which is to be shaped to provide a pot enclosing wall and the second of which is a bottom and includes a center part and a marginal part foldable to provide upstanding wall sections and a plurality of inwardly disposed pleats interconnecting said wall sections, one of said wall sections constituting an integral part of said pot enclosing wall, means interconnecting the ends of said pot enclosing wall to enclose said bottom, one of said sections being substantially opposite said last named wall section and having a transverse slot therein and said pot enclosing wall having a tab disposable upwardly and inwardly through said slot to lock said portions together.

6. The jacket of claim 5 in which the transverse slot in the wall section is spaced from the upper edge thereof a distance substantially equal to the height of the opening established by the tab in the pot enclosing wall thereby to define a web to lock therein when the tab is inserted through the slot.

HENRY BEUKELMAN.

REFERENCES CITED

The following references are of record in the file of this patent:

UNITED STATES PATENTS

| Number | Name | Date |
| --- | --- | --- |
| 333,643 | Lewis | Jan. 5, 1886 |
| 797,175 | Collenburg | Aug. 15, 1905 |
| 991,246 | Rosenfeld | May 2, 1911 |
| 1,009,463 | Bloomer | Nov. 21, 1911 |
| 1,295,418 | Bohlman | Feb. 25, 1919 |
| 1,750,204 | Wichner | Mar. 11, 1930 |